June 2, 1964  F. W. MANN  3,135,241
AUTOMATIC INSECTICIDE APPLICATOR
Filed March 12, 1962  3 Sheets-Sheet 1
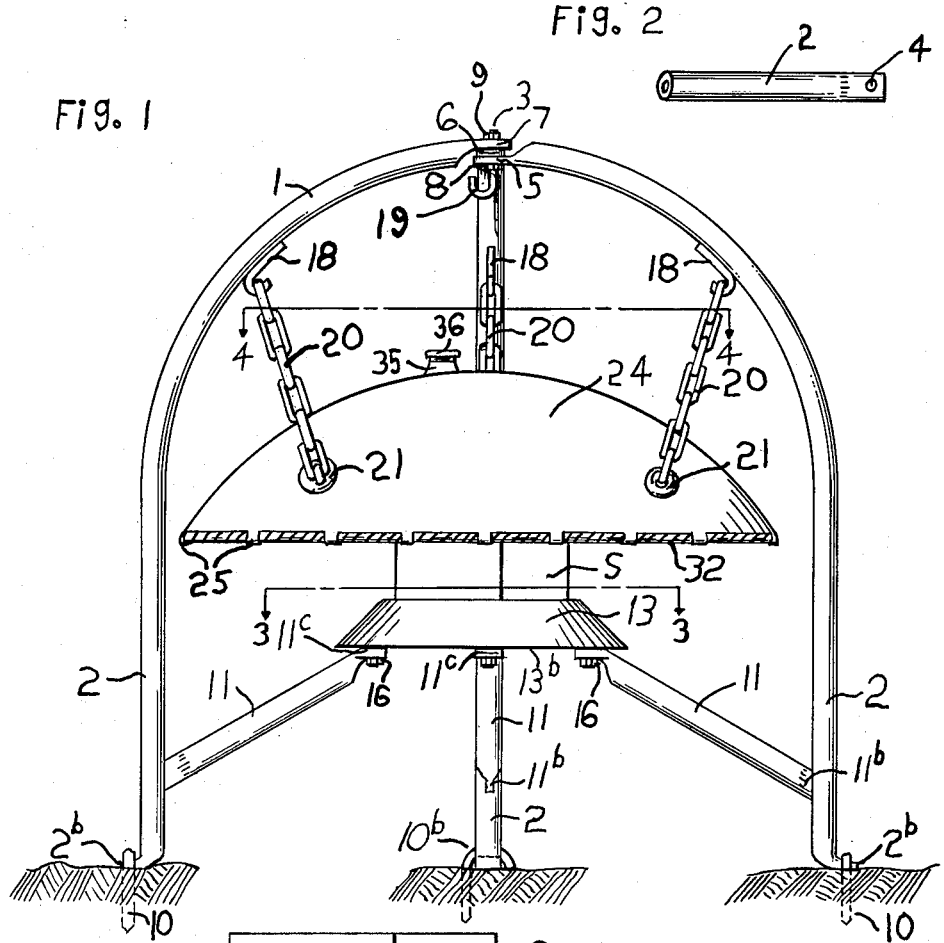
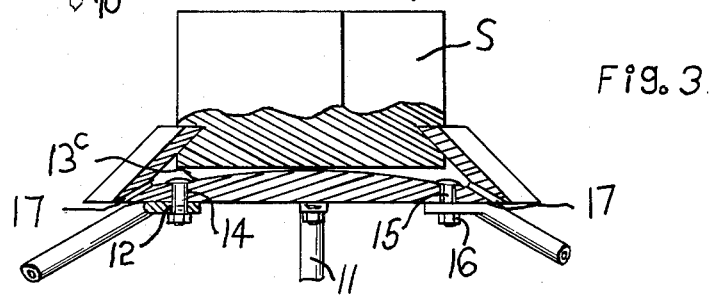
INVENTOR.
Frederick W. Mann

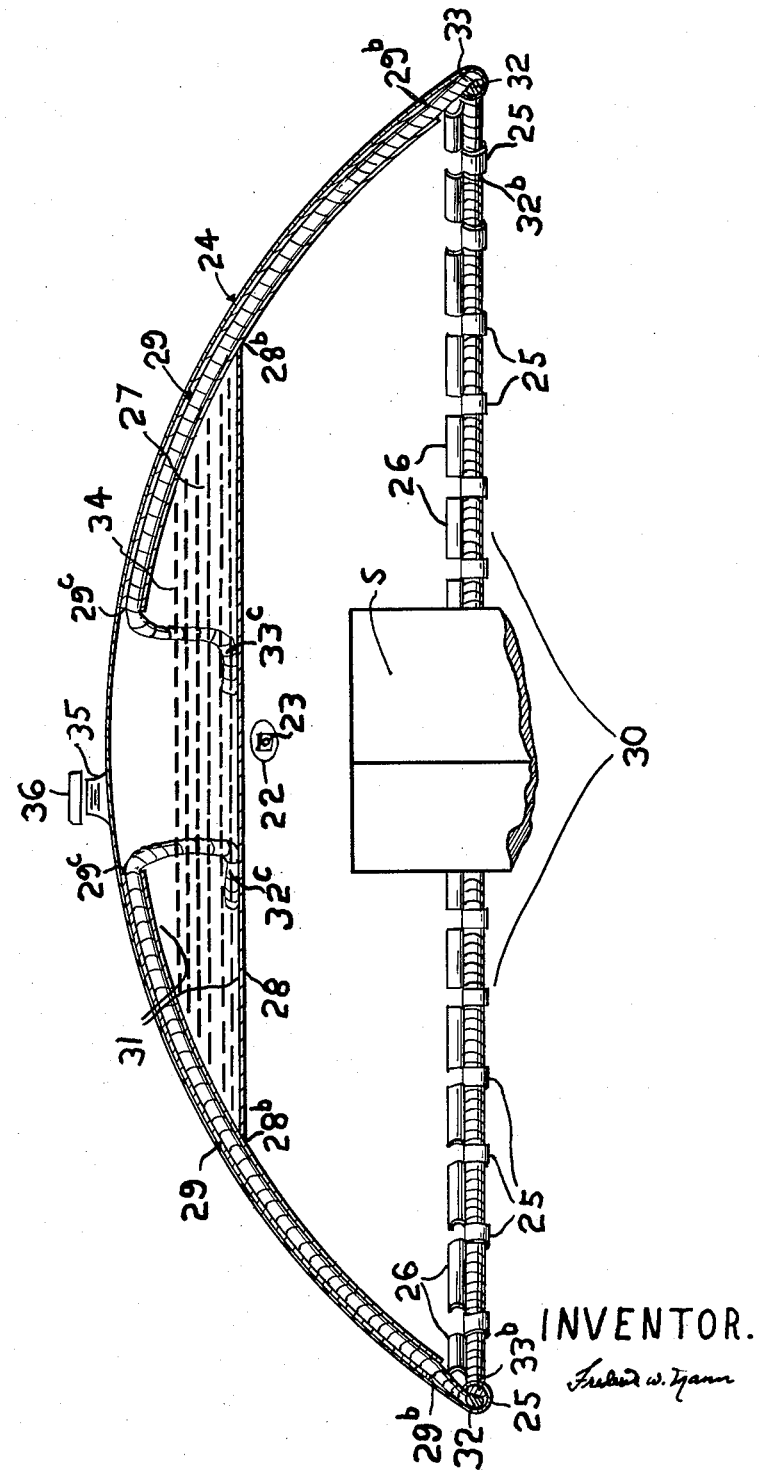

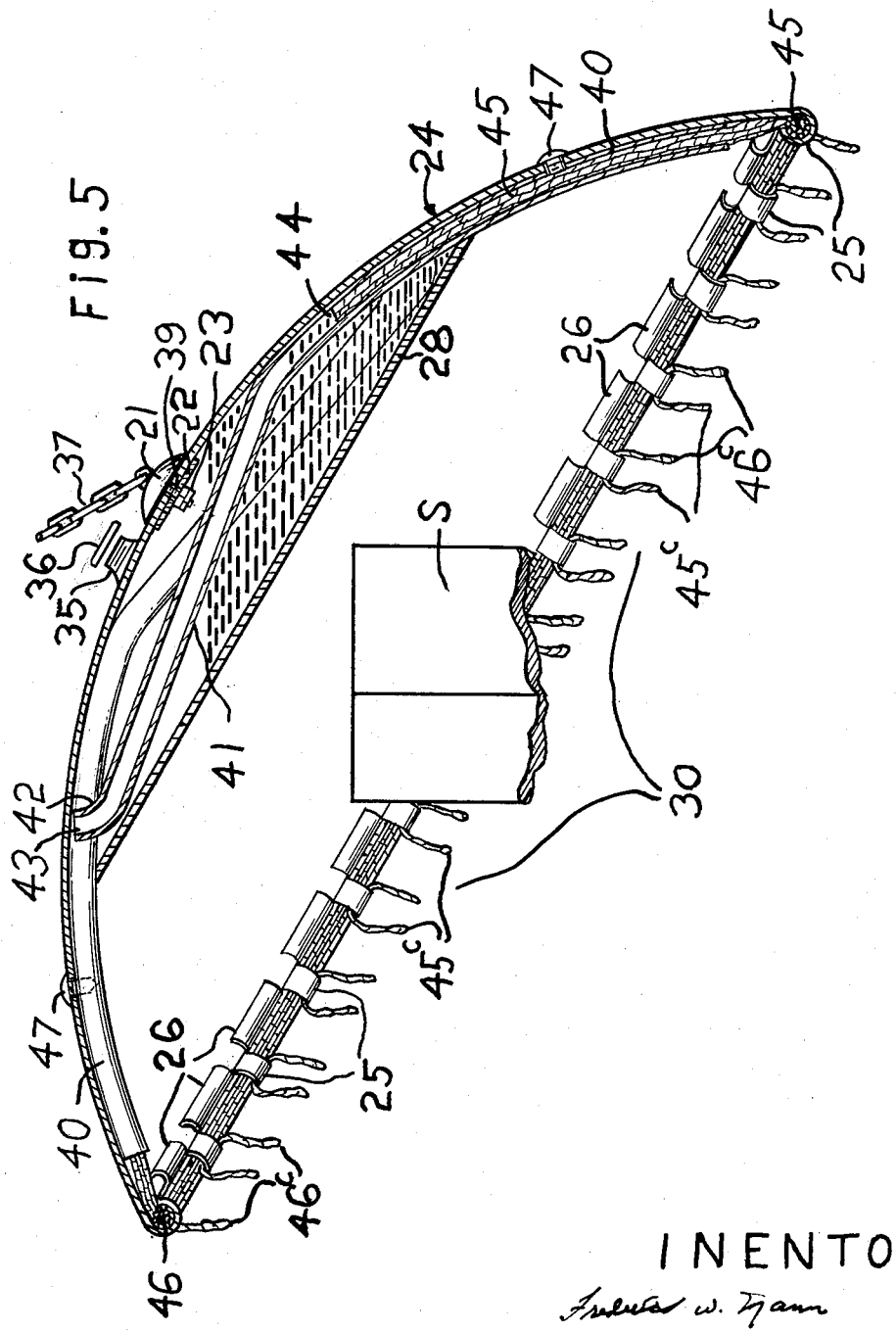

3,135,241
AUTOMATIC INSECTICIDE APPLICATOR
Frederick W. Mann, Box 138, Waterville, Kans.
Filed Mar. 12, 1962, Ser. No. 178,886
6 Claims. (Cl. 119—157)

This invention relates to an automatic livestock insecticide applicator and has for its primary object to automatically apply insecticide to the head area of livestock.

It is an object of the present invention to store and provide a means to automatically apply insecticide to livestock, such as cattle, horses or other animals while they are in pasture or roving a range.

It is an object of the present invention to provide a hood suspending framework said framework supporting a salt container in spaced relation to the ground, said space being such that all sizes of a species of animals may partake of the salt and consequently be treated with the insecticide.

It is another object of the present invention to suspend an insecticide applying hood in adjustable spaced relation over a salt container.

It is still another object of the present invention to save fragmentary pieces of salt from being licked from the salt container by animals and wasted on the ground.

Another object of the present invention is to provide an automatic livestock insecticide applicator which has a minimum number of parts, is inexpensive to manufacture and efficient in operation and use.

The above and other objects may be attained by employing this invention which embodies a stationary frame to be conveniently located within an area which a herd of animals habitat, a hood suspended in adjustable spaced hovering relation over a salt container, said container supported by braces radiating from the container to the lower leg portion of the stationary frame, means within said hood to store liquid insecticide and means around hood base to automatically apply insecticide to the head area of animals as the animals reach under said hood to partake of salt and thus coming in contact with the insecticide applying means. Heretofore there has been in general use automatic insecticide applicators to apply insecticide to the body area, in general, of animals. My novel invention automatically applies insecticide to the area of the head of animals thus riding the immediate area of the face of insects that normally habit there. The insecticide performs an important function as livestock, cattle, are plagued with "face fly" and "horn fly" thus repelling these two types of flies and other insects that normally habitat the face of levstock. Etomologists believe the "face fly" along with other insects carry and transmit infectious keratitis (pink eye); thus would follow to eliminate "face fly" and other insects from the face of cattle would help to control "pink eye."

For other objects and for a better understanding of the invention reference may be had to the following detailed description, taken in conjunction with the accompanying drawing in which:

FIGURE 1, a side view, shows a device constructed in accordance with the invention.

FIGURE 2 is a rotated, fragmentary, perspective view of the upper end portion of one of the legs as viewed in FIGURE 1.

FIGURE 3 is a transverse vertical sectional view of the salt container taken substantially in the plane of the line 3—3 of FIGURE 1 with the upper portion of the salt block being illustrated in elevation.

FIGURE 4 is an enlarged transverse vertical sectional view of the hood taken in the plane of the line 4—4 of FIGURE 1, with the upper part of the salt block illustrated in elevation.

FIGURE 5 is an enlarged transverse view of a modified hood and hood suspending means with the upper part of the salt block illustrated in elevation similar to the view in FIG. 4.

In carrying out the invention, referring now specifically to the drawing, there is a hood suspending, tubular frame, composed, as shown, with three substantially identical supporting legs 2, equally spaced apart in relation to each other, which intersect and are secured by the threaded portion 3 of the J shaped hook 19, extending through the aligned holes 4 near the end of the horizontally flattened end portions 5, 6, and 7; and nut 8 screw-threaded substantially onto threaded end portion of said hook, abutting end portion 5; and nut 9 screw-threaded onto threaded end portion of said hook, abutting upper end portion 7, comprising a substantially rigid frame.

It will be noted the horizontally flattened end portions 5 and 7 are offset above and below the longitudinal axis of the leg end portions respectively; while end portion 6 is flattened on the longitudinal axis. The axially aligned flattened end portion 6 is sandwiched between end portions 5 and 7; thus providing a rigid and balanced means of support. The legs 2 substantially arcing outwardly and turning vertically downward from the point of inception terminate at the outturned horizontally flattened, supporting points 2$^b$.

Three stakes 10, driven into the ground with the hook part 10$^b$ arcing over the outturned leg 2$^b$, abutting the upturned portion of the leg 2, maintain the frame 1 firmly in place.

Three identical, equally spaced, supporting tubular braces 11, extend obliquely upward from a fixed position on supporting leg 2, to the salt container 13; lower end portion 11$^b$ of said braces is vertically flattened in line with the braces longitudinal axis and the end thereof is obliquely shaped, thus conforming to the outer longitudinal surface of the leg 2. The upper end portion 11$^c$ being horizontally flattened, upwardly offset, and bent oblique to the longitudinal axis of said brace so as to conform to the horizontal bottom 13$^b$ of the salt container base 13$^c$. The hole 12 near the end of end portion 11$^c$ aligns with hole 14 in the base of salt container 13; a slotted, roundheaded bolt 15 extending through said aligned holes and secured by nut 16, supporting said salt container in spaced relation to the ground at such a height, in the case of cattle, that all sizes can partake of the salt.

Salt container 13 has an outer truncated conical shaped retaining wall provided with a flat based, annular convex bottom 13$^e$, a portion of said bottom projection extending substantially outward from said retaining wall upper edge. The peripheral base portion is shown with a plurality, three in this case, of substantially horizontally inclined, radially aligned through apertures 17 arranged in equal spaced apart relation to each other. The object of the convex bottom and the through apertures is to permit water or liquid forming in the salt container to flow to the sides and escape therefrom. Three vertical holes 14, before-mentioned, are arranged in circumferentially equal spaced apart relation to each other and to the vertical axis of said salt container.

The object of the truncated conical shaped retaining wall is to trap fragmentary portions of salt which occur upon the final consumption of a salt block so that animals cannot lick the fragment from the salt container and waste it but assure that all the salts is properly consumed.

Three J shaped hooks 18 are fastened one each to the upper end leg portion.

Three hood height adjusting link chains 20, the upper link in this case, resting in the arc of the hooks 18, depending therefrom, obliquely inward, the lower links of each chain secured in the eye of an eye-bolt 21; threaded portion of said eye-bolt extending through apertures on the peripheral surface of the hood 24 immediately below the cross section 28, said eye-bolts circumferentially aligned and equally spaced apart; through a supporting washer 22 and firmly secured by two screw-threaded lock nuts 23; thus suspending said hood in spaced hovering relation to the salt block S and to the salt container 13. Said space may be varied by taking up links or letting links out on the hooks 18. It may be necessary to widen the space and allow livestock to become accustomed to partaking salt from under the hood and after the livestock become accustomed, lower the hood to a more applicable position; thus it becomes apparent that hood 24 so suspended by chains 20 is substantially confined in its horizontal movement by placement of the suspending means. The object of the hood being thus suspended is to prevent the hood from being freely whipped by wind gusts and striking the salt block S or the salt container 13 depending upon the adjusted height of said hood. Livestock, upon nosing under the hood base 30 to partake of salt, force the hood 24 upward in an inclined position; thus can be seen the substantially vertical upward movement of said hood is unrestricted within applicable limits.

The hood 24 is a device made up of a substantially hemispheroidal shaped shell member having an open concave interior and an inner circular cross section reservoir bottom 28 abutting and fixed to the inner annular surface of said shell member; said bottom lying parallel to the hood base 30 and positioned substantially below the circular opening 35; said bottom being intersected at diametrically aligned opposed points $28^b$ by two, in this case, substantially vertical inclined arcing tubes 29. The hood having an outwardly stamped, externally screw-threaded circular opening 35 adapted to be threaded on to the internally screw-threaded cap 36, shown removed; thus is provided a means of replenishing the liquid insecticide 27. The hood base 30 is comprised of a plurality of alternately spaced, substantially narrow tube resembling sections, circumferentially aligned flanges 25, appendages of the hood 24, within which the insecticide applier rope is securely fastened. The object of flange 25 being narrowly shaped is to provide for a maximum rope contact surface exposure to the face of livestock. Positioned alternately between and above said flanges are substantially wide tube resembling sections, circumferentially aligned flanges 26, also appendages of said hood. It will be noted the narrow top edge of flange 25 horizontally aligns with the wide longitudinal bottom edge of flange 26; thus providing vertical upward support to that portion of the rope so abutting said bottom edge of said flange 26. It will also be noted flange 26 adds to the annular strength of the hood base 30.

Two, in this case, identical, oppositely disposed, vertically aligned arcing tubes 29 abut and conform to the internal, concave, meridinal surface of the hood 24, lower end portions thereof beginning at point $29^b$, extend upward through and fixed to the apertures $28^b$; extending through the liquid insecticide 27, arcing over said insecticide and terminating at points $29^c$ near the circular opening 35. The lower end portions $29^b$ so extend down from bottom 30 so as to protect that portion of the rope, so encased, from coming in contact with the salt block S upon the horizontal movement of the hood 24. It is to be understood that the upper terminating end portion of tubes 29, points $29^c$, are so located above the liquid insecticide full level 34 so as to prevent the unwarranted escape of said insecticide from the reservoir 31.

Rope 32, beginning with the end $32^c$ resting on the reservoir bottom 28 submerged in the insecticide 27, extends vertically upward through and above said insecticide, wicking said insecticide to point $29^c$ there entering and extending within the inner longitudinal peripheral surface of said tube 29, extending through the reservoir bottom 28, exiting vertically downward at point $29^b$, turning sharply horizontal, lying contiguous the stub end of rope 33, extending horizontally in a semicircle around the annular base 30, firmly secured to said base by flanges 25 (this portion of the hood 24 not viewed due to the excluded portion of the transverse sectional view) again coming in contact, this time inwardly contiguous to a portion of rope 33; end portion of rope 32 terminating at point $32^b$ held firmly secure by the flange 25.

Ropes 32 and 33 are identical except for position of the end portions $32^b$ and $33^b$, ropes so numbered for clarity; thus it is to be understood that rope 33 wicks and applies insecticide as does rope 32. The stub end portions $32^b$ and $33^b$ furthermost from the wicking ends $32^c$ and $33^c$ respectively are so positioned contiguous a portion of the rope immediately wicking from the reservoir 31 so as to assist said ropes in obtaining a sufficient supply of insecticide by wicking insecticide from the contiguous portion.

In the modified form of the invention illustrated in FIGURE 5 the same stationary frame and container means described is employed but in place of three suspending chains 20 there is only one chain 37 suspended from the J shaped hook 19 at the apex of the frame 1, the lower end portion of said chain is fastened to a conventional eye bolt 21, threaded portion of said bolt extending through a hole 39 in the apex of the hood 24, through a supporting washer 22 shown in section and securely fastened to said hood by locked nuts 23; thus suspending said hood from one point. The object of this of course is to allow for a more liberal movement of said hood 24 and thus a more inclined position of the hood when animals nose the hood upward in partaking salt, the object of the inclination will be understandable in the ensuing explanation.

Instead of the tubes 29 terminating near the apex of the hood, tubes 40 extend obliquely at 41 from the point near the hood apex toward the outer annular surface of the reservoir bottom 28 curving at 42 and turning upward at 43 before terminating.

Instead of the rope depending from the tube 29 and lying on the reservoir bottom wicking insecticide upward, the rope now terminates at point 44 and is automatically supplied insecticide upon the hood being inclined by animals nosing up the hood as viewed in FIGURE 5. Insecticide within the tube 40 flows by gravitational force toward rope end portion at point 44; said end portion becoming saturated and the remainder of the rope 45 wicking insecticide through the entirety of the ropes 45 and 46; thus it can be seen that when the hood is oppositely inclined rope end portion of rope 46 at point 44 will be supplied with liquid insecticide.

Instead of the ropes 45 and 46 being braided solid said ropes are comprised of a plurality of strands, in this case twenty-eight, an equal number of said strands positioned on opposite sides of the annular hood base 30, each strand being consecutively longer, end portions $45^c$ and $46^c$ thereof depending a substantial distance from said base, firmly secured by flanges 25. Ropes 45 and 46 are identical except for position. A conventional sheet metal screw 47 is screw-threaded through aligned holes in the hood 24 and the tube 40 and through the rope 45 or 46 thus acting as a keeper to maintain said rope within the tube 40. It will be noted that the strands from opposite sides are positioned contiguous a portion of each other; the object being to aid all portions of the rope in maintaining an adequate supply of liquid insecticide.

The object of the depending end portions $45^c$ and $46^c$ is to insure that insecticide is properly applied to the head area of animals.

It is to be understood that all metallic parts of the combination automatic insecticide applicator and salt saver coming in contact with salt shall preferably be coated with tin or other suitable material friendly to salt to maintain them against corrosion.

The foregoing is considered as illustrative only of the principles of the preferred embodiment of the invention. Further, since numerous modifications and changes will readily occur to those skilled in the art it is not desired to limit the invention to the exact construction and operation shown and described, and accordingly, all suitable modifications and equivalents may be resorted to, falling within the scope of the invention as claimed.

I claim:

1. An automatic adjustable insecticide applicator and salt saver apparatus for applying insecticide to the head area of livestock enticed to the apparatus by salt, comprising, a frame having three integral leg members, each leg member having a bottom base portion, an upright portion, a generally horizontally extending portion, and a flattened terminal portion having an aperture therein on said horizontally extending portion, a pin means extending through said apertures in said terminal portions of said leg members rigidly joining same in assembled operative relationship, hook means secured on each leg member positioned adjacent the top of said upright portion, a container means for salt mounted on said frame comprising, an annular convex bottom portion, an upright frusto-conical shaped retaining wall integrally joined to said bottom portion, downwardly inclined generally radially extending apertures in said bottom portion adjacent the periphery thereof, three inclined supporting braces for said container means, each of said braces being joined at one end to said container means and at the other end to said upright portion of said leg member, a hood means adjustably mounted on said frame in spaced vertical relation to said container means comprising, a convex shaped top shell member, a flat circular bottom joined to the underside of said shell member forming therewith a reservoir for insecticide, an inlet opening for insecticide in the top of said shell member, a plurality of spaced circumferentially aligned cylindrically shaped sections on the periphery of said shell member, flange members, each having a horizontal portion, disposed between and immediately above said cylindrically shaped sections, rope means disposed in and supported by said cylindrically shaped sections, a plurality of generally radially extending arch-shaped tubes secured to the underside of said convex shall member extending from a point adjacent said cylindrically shaped sections to a point within said reservoir and well above said circular bottom, rope wick means disposed in said tubes, said rope wick means joined to said first-mentioned rope means in said sections at one end portion and with the other end portion extending well beyond the other end of said tube disposed in close proximity to the bottom of said reservoir, three equally spaced hood supporting link chains, each of said chains attached at one end portion to the outside of said shell member and being adjustably attached to said hook means on said leg members at the other end portion thereof, said insecticide application adapted to provide weather protection for salt and apply insecticide to the heads of livestock enticed to the apparatus by the salt while consuming same.

2. An automatic adjustable insecticide applicator and salt feeder apparatus for applying insecticide to the head area of livestock enticed to the apparatus by salt, comprising, a frame having three leg members, each leg member having a bottom base portion, an intermediate upright portion, a generally horizontally extending portion, and a flattened terminal portion having an aperture therein on said horizontally extending portion, a pin means extending through said apertures in said terminal portions of said legs rigidly joining same in assembled operative relationship, hook means on said pin means, a container means for salt mounted on said frame comprising, an annular convex bottom portion, an upright frusto-conical shaped retaining wall portion integrally joined to said bottom portion, downwardly inclined generally radially extending apertures in said bottom portion adjacent the periphery thereof, three inclined supporting braces for said container means, each of said braces being joined at one end to said container means and at the other end to said upright portion of said leg member, a hood means adjustably mounted on said frame in spaced relation to said container means comprising, a convex shaped top shell member, a flat circular bottom joined to the underside of said shell member forming therewith a reservoir for insecticide, an inlet opening for insecticide in the top of said shell member, a plurality of spaced circumferentially aligned cylindrically shaped sections on the periphery of said shell member, flange members, each having a horizontally disposed portion, disposed between and immediately above said cylindrically shaped sections, a rope means disposed in and supported by said cylindrically shaped sections, a plurality of loose short drooping strands associated with said rope means, generally radially extending arch-shaped tubes secured in part to the underside of said convex shell member extending from a point adjacent said cylindrically shaped sections to a point within said reservoir closely spaced from the bottom, a transverse generally upwardly extending terminal portion on each of said tubes positioned in closely spaced relationship to the bottom of said reservoir, a relatively short rope wick means disposed in said tube and joined to said rope means in said section and extending upwardly in said tube terminating at a point slightly above said bottom and short of the end thereof, a link chain joined at one end to the top center of said shell member and to said hook means on the other end thus supporting said hook means in tiltable adjustable spaced relationship to said container means, said insecticide applicator adapted to provide weather protection for salt and apply insecticide to the heads of livestock enticed to the apparatus by the salt while consuming same.

3. An automatic insecticide applicator and feeder apparatus for applying insecticide to the head area of livestock enticed to the apparatus comprising, a frame having a plurality of upright members rigidly joined in operative supporting relation, hook means secured to said frame, a container means mounted on said frame comprising a bottom portion, an upright wall portion joined to said bottom portion, a plurality of spaced apertures in said bottom member, support means for said container means rigidly joined to said frame and container means, a hood means adjustably mounted on said frame in spaced vertical relation to said container means comprising, a convex shaped top shell member, a circular bottom joined to the underside of said shell member forming therewith a reservoir for insecticide, an inlet opening for insecticide in the top of said shell member, a plurality of spaced cylindrically shaped sections on the periphery of said shell member, a rope means disposed in and supported by said sections, tubes secured to the underside of said convex shell member extending from a point adjacent the periphery to a point within said reservoir and well above said circular bottom, wick means disposed in said tubes, each wick means operatively associated with said first-mentioned rope means in said sections with one end portion to pass insecticide thereto and with the other end portion extending well beyond the other end of said tube in close proximity to the bottom of said reservoir, suspension means for supporting said hood means joined to said hood and to said hook means on the frame, said insecticide applicator adapted to provide weather protection for said container means and apply insecticide to the heads of livestock enticed to the apparatus.

4. An automatic insecticide applicator and feeder apparatus for applying insecticide to the head area of livestock enticed to the apparatus, comprising, a frame having a plurality of upright members joined in rigid operative relation, hook means secured to said frame, a container means mounted on said frame comprising, a bottom portion, an upright wall portion joined to said bottom portion, a plurality of draining apertures in said bottom portion, support means for said container means joined to said frame, a hood means mounted on said frame in spaced relation to said container means comprising, a convex shaped shell member, a flat circular bottom joined to the underside of said shell member forming therewith a reservoir for insecticide, an inlet opening for insecticide in said shell member, a plurality of spaced circumferentially aligned sections on the periphery of said shell member, a rope means supported by said sections, tubes secured to the underside of said convex shell member extending from a point adjacent said sections outside of the reservoir to a point within said reservoir, generally upwardly extending terminal portions on said tubes positioned in closely spaced relation to the bottom of said reservoir, wick means disposed in said tubes operatively associated with said rope in said sections and terminating short of the ends of the tubes thereof, a support means joined to said shell member and to said hook means supporting said hood means in tiltable adjustable spaced relationship to said container means, said insecticide applicator adapted to provide weather protection for said container and apply insecticide to the heads of livestock enticed to the apparatus.

5. An insecticide applicator and feeder apparatus for livestock comprising, a frame having upright members secured together in rigid operative supporting relationship, a container means mounted on said frame comprising a bottom portion, an upright wall portion joined to said bottom portion, draining means in said bottom portion of said container means, support means for said container means joined to said frame supporting same in spaced relationship to the ground thereof, a hood means mounted on said frame in spaced vertical relation to said container means comprising, a convex shaped shell member, a circular bottom joined to the underside of said shell member forming therewith a reservoir for insecticide, an inlet opening for insecticide in said hood means, a plurality of spaced sections on the periphery of said shell member, an absorbent means supported by said sections, tube means secured to the underside of said convex shell member extending from a point adjacent said sections outside of said reservoir to a point within said reservoir, wick means disposed in said tube, said wick means operatively engaging said first-mentioned absorbent means in said sections to pass insecticide, means joined to said frame for supporting said hood means in spaced relation to said container means, said insecticide applicator adapted to provide weather protection for said container means and apply insecticide to the heads of livestock.

6. An insecticide applicator and feeding apparatus for livestock comprising, an upright rigid supporting frame including an upright member, a container means mounted on said frame comprising, a lower portion and an upright portion joined to said lower portion, a support means for said container means joined to and supported by said upright member of said frame supporting same in spaced relation to the ground thereof, a hood means mounted on said frame in spaced vertical relation to said container means comprising, an outer shell member, a bottom joined to the underside of said shell member forming therewith a reservoir for insecticide, an inlet opening for insecticide in said hood means, a plurality of spaced hanger means on the periphery of said shell member, an absorbent means depending from said hanger means, tube means secured to the underside of said shell member extending from a point outside said reservoir to a point within said reservoir, wick means disposed in said tube means, said wick means operatively engaging said first mentioned absorbent means depending from said hanger means to pass insecticide from said reservoir to said absorbent means, means joined to said frame for supporting said hood means in spaced relation to said container means, said insecticide applicator adapted to provide weather protection for said container means and apply insecticide to the heads of cattle.

References Cited in the file of this patent

UNITED STATES PATENTS

| 2,273,616 | Beatty | Feb. 17, 1942 |
| 2,777,421 | Hiebert | Jan. 15, 1957 |
| 2,825,305 | Tatge | Mar. 4, 1958 |
| 3,016,879 | Ryan | Jan. 16, 1962 |
| 3,055,340 | Davis | Sept. 25, 1962 |